US011878659B2

(12) United States Patent
Sauer

(10) Patent No.: US 11,878,659 B2
(45) Date of Patent: Jan. 23, 2024

(54) WHEELED CARRIER FOR TOWING VEHICLE AND METHOD OF USE

(71) Applicant: Todd M. Sauer, Omaha, NE (US)

(72) Inventor: Todd M. Sauer, Omaha, NE (US)

( * ) Notice: Subject to any disclaimer, the term of this patent is extended or adjusted under 35 U.S.C. 154(b) by 0 days.

(21) Appl. No.: 17/679,362

(22) Filed: Feb. 24, 2022

(65) Prior Publication Data

US 2023/0264635 A1 Aug. 24, 2023

(51) Int. Cl.
*B60R 9/06* (2006.01)
*B60R 9/10* (2006.01)
(52) U.S. Cl.
CPC . *B60R 9/06* (2013.01); *B60R 9/10* (2013.01)
(58) Field of Classification Search
CPC ............ B60R 9/06; B60R 9/10; B62D 63/065
USPC ....................................... 224/412
See application file for complete search history.

(56) References Cited

U.S. PATENT DOCUMENTS

| 3,074,500 | A | * | 1/1963 | Ulinski | B60D 1/66 |
| | | | | | 280/43.23 |
| 3,393,922 | A | * | 7/1968 | Adams | B60P 3/32 |
| | | | | | 280/901 |
| 3,436,096 | A | * | 4/1969 | Rogge | B60P 3/40 |
| | | | | | 280/762 |

(Continued)

FOREIGN PATENT DOCUMENTS

| CN | 107743465 A | 2/2018 |
| DE | 3739561 A1 | 6/1989 |

(Continued)

OTHER PUBLICATIONS

Notification of Transmittal of the International Search Report and the Written Opinion of the International Searching Authority (PCT/US23/63167).

*Primary Examiner* — Peter N Helvey
(74) *Attorney, Agent, or Firm* — McGrath North Mullin & Kratz, PC LLO; Luke C. Holst

(57) ABSTRACT

The present disclosure relates in general to carriers intended to be utilized with towing vehicles, and more specifically, to a wheeled carrier and method of use for providing additional cargo space while being towed behind an automobile or all-terrain vehicle. One aspect of the present disclosure is to provide a variety of removable and interchangeable body styles each designed to be utilized with different types of cargo (e.g., luggage, bikes, small animals) such that the carrier may support a wide range of uses depending on certain preferences of the consumer. Another aspect of the present disclosure is providing a wheeled carrier that is rigidly and removably coupled to the chassis of the towing vehicle at multiple positions without requiring a ball hitch, pivoting pin box, or sliding hitch. Rigidly coupling the carrier directly to the chassis of the towing vehicle at multiple positions significantly improves stability and safety while towing as compared to traditional trailers that are pivotably coupled at a single location. The carrier and method of use of the present disclosure is designed to be utilized with smaller, more fuel-efficient towing vehicles to offer additional cargo storage space. Moreover, the carrier and method of use allows the carrier to be decoupled from the towing vehicle to lessen the impact on overall fuel economy and range mileage for the towing vehicle when the carrier is not being used.

20 Claims, 6 Drawing Sheets

(56) References Cited

U.S. PATENT DOCUMENTS

| | | | | |
|---|---|---|---|---|
| 3,752,496 | A | * | 8/1973 | Meinecke, Jr. ...... B62D 61/125 |
| | | | | D12/160 |
| 3,794,227 | A | * | 2/1974 | Stearns ................ B60R 9/10 |
| | | | | 224/532 |
| 3,870,340 | A | * | 3/1975 | Winter ............. B62D 53/0864 |
| | | | | 280/901 |
| 3,980,313 | A | * | 9/1976 | Meinecke, Jr. ...... B62D 53/045 |
| | | | | 280/81.1 |
| 4,239,253 | A | * | 12/1980 | Golze .................. G01G 19/08 |
| | | | | 116/28 R |
| 4,566,717 | A | | 1/1986 | Arthur et al. |
| 4,593,840 | A | * | 6/1986 | Chown ............. B62D 63/064 |
| | | | | 224/520 |
| 4,645,230 | A | | 2/1987 | Hammons |
| 4,744,590 | A | * | 5/1988 | Chesney .............. B60R 9/06 |
| | | | | 224/520 |
| 5,397,148 | A | * | 3/1995 | Nelson ................ B60D 1/07 |
| | | | | 280/656 |
| 5,460,304 | A | * | 10/1995 | Porter .................. B60R 9/12 |
| | | | | 224/532 |
| 5,520,404 | A | * | 5/1996 | Schulte ................ B60D 1/173 |
| | | | | 280/460.1 |
| 5,522,685 | A | * | 6/1996 | Lessard ................ B60P 7/14 |
| | | | | 410/139 |
| 5,699,985 | A | * | 12/1997 | Vogel ................... B60R 9/06 |
| | | | | 224/521 |
| 6,199,894 | B1 | * | 3/2001 | Anderson ........... B62D 63/025 |
| | | | | 180/209 |
| 6,623,028 | B1 | * | 9/2003 | Johnston ............ B62D 63/061 |
| | | | | 280/656 |
| 6,626,449 | B2 | * | 9/2003 | Hazen ................. B60D 1/52 |
| | | | | 280/492 |
| 6,644,706 | B2 | * | 11/2003 | Rolph ................. B62D 33/077 |
| | | | | 280/455.1 |
| 6,722,727 | B2 | * | 4/2004 | Votruba .............. E05B 83/16 |
| | | | | 296/181.3 |
| 6,802,441 | B1 | * | 10/2004 | DuRant ............... B60R 9/065 |
| | | | | 224/521 |
| 7,631,881 | B2 | * | 12/2009 | Broemeling ........ B60G 9/02 |
| | | | | 280/5.521 |
| 7,641,235 | B1 | * | 1/2010 | Anduss ............... B62B 5/0003 |
| | | | | 224/520 |
| 8,061,572 | B2 | * | 11/2011 | Myrex ................ B60R 9/06 |
| | | | | 224/502 |
| 9,120,429 | B2 | * | 9/2015 | Lungershausen ......... B60R 9/06 |
| 9,216,698 | B2 | * | 12/2015 | Rhodes ............... B60R 9/065 |
| 9,533,624 | B2 | * | 1/2017 | Cha .................... B60R 19/023 |
| 9,643,669 | B1 | * | 5/2017 | Clark .................. B60L 50/53 |
| 10,023,261 | B2 | * | 7/2018 | Kilcrease ............ B62K 27/04 |
| 11,290,032 | B1 | * | 3/2022 | Iriarte ................. B60G 13/08 |
| 2002/0190499 | A1 | * | 12/2002 | Connor ............... B60D 1/155 |
| | | | | 280/491.1 |
| 2006/0151555 | A1 | * | 7/2006 | Mills ................... B60R 9/06 |
| | | | | 224/521 |
| 2008/0023234 | A1 | * | 1/2008 | Wang .................. B62M 7/14 |
| | | | | 280/204 |
| 2008/0289888 | A1 | * | 11/2008 | Page, Jr. ............. B62D 47/003 |
| | | | | 180/14.2 |
| 2010/0001029 | A1 | * | 1/2010 | Tai ...................... B60R 9/06 |
| | | | | 224/510 |
| 2010/0038883 | A1 | | 2/2010 | Thedford |
| 2015/0314734 | A1 | * | 11/2015 | Robinson ........... B60R 9/10 |
| | | | | 414/462 |
| 2016/0375839 | A1 | * | 12/2016 | Weihl ................. E01H 5/061 |
| | | | | 37/231 |
| 2017/0174021 | A1 | | 6/2017 | Mathews et al. |
| 2019/0176319 | A1 | * | 6/2019 | Wiltsey .............. B62B 1/208 |
| 2019/0202250 | A1 | * | 7/2019 | Pack ................... B60P 3/00 |
| 2022/0176886 | A1 | * | 6/2022 | Sailer ................. B60R 9/06 |
| 2022/0258550 | A1 | * | 8/2022 | Abramov ........... B62K 27/003 |

FOREIGN PATENT DOCUMENTS

| | | |
|---|---|---|
| DE | 3829638 A1 | 6/1989 |
| DE | 19539647 A1 | 4/1997 |
| DE | 2020/16105321 U1 | 1/2018 |
| FR | 3037311 A1 | 12/2016 |
| FR | 3037308 B1 | 3/2019 |
| GB | 2209718 A | 5/1989 |
| WO | 2012/156397 A1 | 11/2012 |
| WO | 2013/063663 A1 | 5/2013 |
| WO | 2016/198768 A1 | 12/2016 |

* cited by examiner

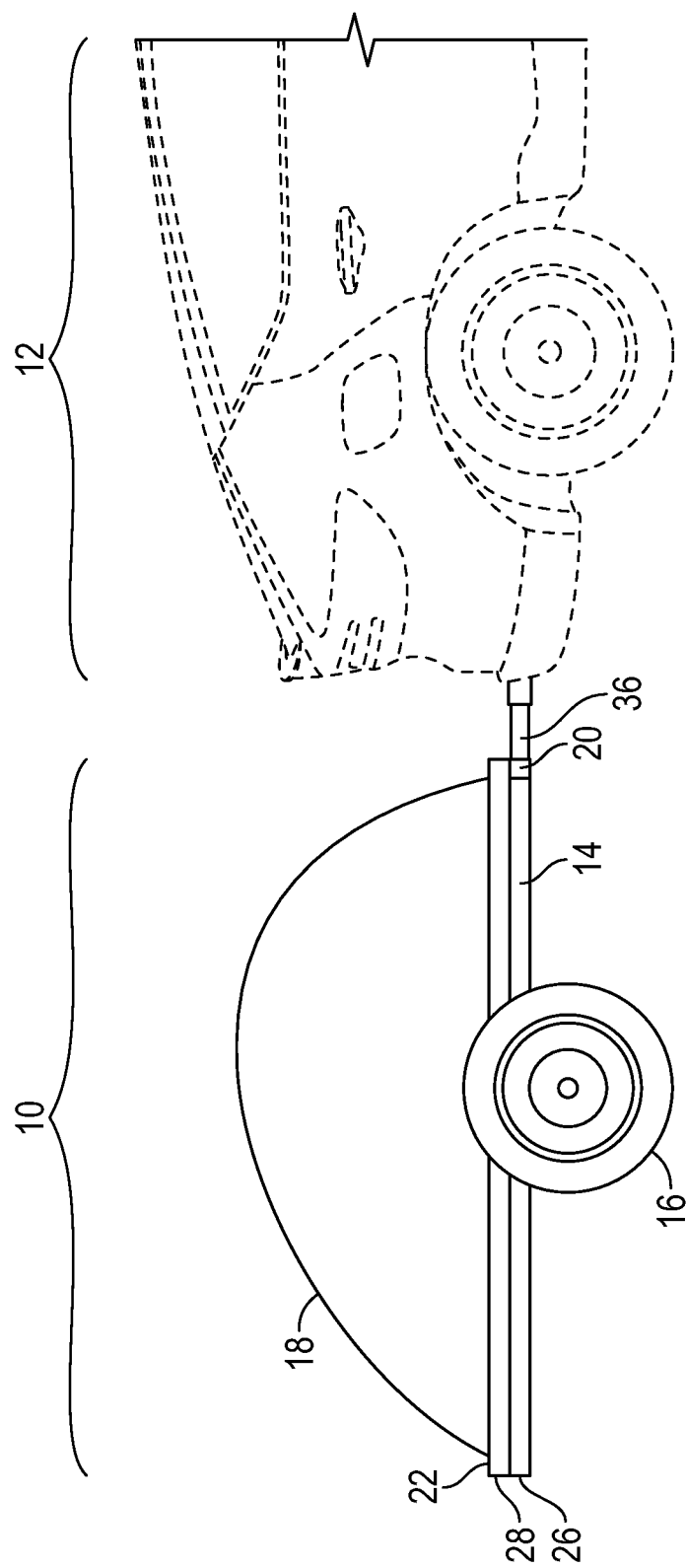

WHEELED CARRIER FOR TOWING VEHICLE AND METHOD OF USE

FIELD OF THE INVENTION

The present invention relates in general to towable, wheeled carriers intended to be coupled to a towing vehicle, such as an automobile or all-terrain vehicle ("ATV"). The carrier may be rigidly coupled to the frame or chassis of the towing vehicle without requiring a ball hitch, pivoting pin box, or sliding hitch. The purpose of the invention is to provide a light carrier that is capable of being utilized with smaller towing vehicles that offers additional cargo storage space without sacrificing fuel economy and range mileage.

BACKGROUND OF THE INVENTION

Vehicle owners typically have two basic requirements. First, the vehicle must have strong fuel efficiency. Second, the vehicle must be able to carry a requisite number of passengers (preferably comfortably), and have enough remaining space for cargo. These two requirements are often in direct contravention with one another.

For instance, current options available to consumers with families are to purchase a larger vehicle, such as a sport utility vehicle ("SUV"), truck or van, able to seat four to eight people comfortably with spacious cargo areas. Such vehicles, however, characteristically offer poorer gas mileage due to their large size, weight and aerodynamics as compared to smaller vehicles. "Poor" gas mileage, while a relative term depending on the particular vehicle, is commonly defined as anything less than 20 miles per gallon ("mpg") overall, and less than 30 mpg on the highway.

On the other hand, smaller vehicles such as mid-size sedans, compact and subcompact cars, often provide good gas mileage. Also a relative term, "good" gas mileage is commonly defined as anything more than 30 mpg. Hybrid vehicles that utilize both a gas and electric engine to operate may offer better gas mileage, such as over 60 mpg. Electric vehicles that run exclusively on electrical energy stored in a battery provide superior miles per gallon of gasoline-equivalent ("MPGe"), often ranging between 100-136 MPGe depending on the particular vehicle manufacturer. While a vehicle's personal history and maintenance may also affect fuel economy, generally speaking, vehicles that are smaller, lighter, and have a smaller engine provide better gas mileage than larger, heavier vehicles. As a result, consumers that desire strong fuel efficiency in their vehicles often have to sacrifice comfort and available cargo space.

In an attempt to overcome such limitations, car manufacturers and aftermarket third parties currently offer rooftop carriers to expand the cargo capacity for smaller, more fuel-efficient vehicles. Problems abound with rooftop carriers, however. Factory or aftermarket racks have to be purchased separately from the vehicle, and rooftop carrier manufacturers often manufacture roof racks that only pair with their particular rooftop carrier. Not having an appropriate roof rack may cause the rooftop carrier to fit improperly. If the vehicle owner fails to install the rooftop carrier properly onto the roof rack, the rooftop carrier could become a potential safety hazard while driving. Another problem with adding a rooftop carrier to an SUV or other high-sitting vehicle is that the rooftop carrier consequently changes the vehicle's center of gravity, which increases the risk of rollover due to uneven weight distribution and increased wind resistance. Furthermore, the rooftop carrier will likely increase wind resistance against the vehicle and consequently decrease fuel economy and range mileage for the vehicle. A still further problem with rooftop carriers is that they have weight limitations depending on the particular roof and rack of the vehicle. If these weight limitations are ignored, the rooftop carrier could cause significant damage to the vehicle or present a dangerous situation when a driver abruptly maneuvers the vehicle during stops and turns. In addition, rooftop carriers are often heavy, difficult to install, and inconvenient to load with cargo for consumers.

Another option for consumers to expand cargo capacity in a smaller vehicle is to acquire and install a trailer hitch for towing a trailer. Such trailers, however, are not without significant limitations. For instance, many smaller, more fuel efficient vehicles are simply unable to tow a trailer because they lack the necessary horsepower to pull a meaningful load. Such vehicles, and particularly electric vehicles, suffer significantly reduced mileage range capabilities when towing a trailer. Improper installation of a trailer hitch on the towing vehicle may also create serious problems while towing. For example, if the trailer hitch is installed improperly on the vehicle or the trailer coupler doesn't fit the trailer hitch correctly, the trailer could become unstable during towing and create a safety hazard. Another problem with trailers is that the towing vehicle's braking system must be compatible with the trailer. If incompatible, problems while braking may occur that result in jackknifing or other accidents. Turning while towing a trailer may also create problems if the driver of the towing vehicle is inexperienced or fails to account for the trailer's wider wheel base, which may result in hitting curbs, signs or other items adjacent to the highway when turning. Use of a trailer hitch having a trailer tongue may compound such problems by requiring an even wider turn to avoid accidents. Further accidents may be caused by uneven weight distribution inside the trailer. Unbalanced trailer loads exasperated by wind gusts or uneven pavement can create dangerous conditions while towing, wherein the risk of trailer sway, weaving and fishtailing can result in an overturned trailer instead of tracking stably behind the towing vehicle. Trailer sway is a serious concern when pulling a trailer via a trailer hitch, which can rock the towing vehicle and cause the driver to lose control.

Thus, a desire remains to provide a carrier and method of use that expands cargo capacity for a smaller, more fuel-efficient towing vehicle. A desire also remains to provide a carrier and method of use that may be conveniently and reliably coupled to the towing vehicle in a manner that minimizes safety concerns while driving and while loading/unloading cargo. A desire further remains to provide a carrier and method of use that offers additional cargo storage space to the towing vehicle which is easily removable to lessen impact on fuel economy and range mileage for the towing vehicle when the carrier is not in use. A desire still further remains to provide a carrier and method of use that offers additional cargo space to the towing vehicle which is easily attached and detached to lessen impact on fuel economy and range mileage for the towing vehicle when the carrier is not being used.

SUMMARY OF THE INVENTION

According to one aspect of the present disclosure, a wheeled carrier for transporting cargo is provided. The carrier may comprise a framework having an axle and at least two wheels. The axle and wheels may include a passive steering assembly having a pivot point configured so that the wheels passively turn in the direction of travel of the towing vehicle. The carrier may also include a body that is removably attached to the framework via an intermediate platform. It is contemplated by the present disclosure that various body styles for transporting different kinds of cargo may be interchangeable on the framework. The carrier may therefore support a wide variety of uses depending on certain preferences of the consumer. The platform may comprise a universal mounting base configured to accommodate bodies of a wide variety of sizes, types and configurations. The carrier may also comprise a carrier coupler secured to the framework. The carrier coupler is configured to couple the carrier directly and rigidly to the chassis of a towing vehicle at multiple positions on the chassis. The carrier is not coupled to the towing vehicle using a ball mounted hitch, pivoting pin box, pivot point, or sliding hitch. Rigidly coupling the carrier directly to the chassis of the towing vehicle at multiple positions significantly improves stability and safety while towing as compared to traditional trailers that are pivotably coupled at a single location. The overall length of the carrier attached to the towing vehicle is also configured to be shorter than traditional trailers. As a result, the carrier of the present disclosure is capable of sharper turns due to its shorter turning radius and passive steering assembly which further improves stability and safety while towing as compared to traditional trailers.

Another aspect of the present disclosure is a method of using a wheeled carrier for transporting cargo. In particular, the method may comprise providing a towing vehicle and cargo in need of transportation. The method may further include providing the wheeled carrier of the present disclosure. A particular style of body may be selected out of a variety of available styles depending on the type of cargo, wherein the various body styles are configured to be interchangeable and removably attached to the framework. The method may further comprise coupling the carrier directly to the chassis of the towing vehicle at multiple positions using the carrier coupler. The carrier is not coupled to the towing vehicle using a ball mounted hitch, pivoting pin box, pivot point, or sliding hitch. The carrier may then be towed to a desired location using the towing vehicle, whereafter the cargo is unloaded from the carrier. The method may also include uncoupling the carrier from the chassis of the towing vehicle via the carrier coupler and storing the carrier until further use is required.

Principal Objects and Advantages of the Invention

Therefore, it is a principal object, feature, and/or advantage of the present disclosure to overcome the aforementioned deficiencies in the art and provide a carrier and method of use that may be utilized with smaller, more fuel-efficient towing vehicles.

Another object, feature, and/or advantage of the present disclosure is to provide a carrier and method of use that expands cargo capacity for the towing vehicle.

Yet another object, feature, and/or advantage of the present disclosure is to provide a carrier and method of use that may be conveniently and reliably coupled to the towing vehicle in a manner that minimizes safety concerns while driving.

A further object, feature, and/or advantage of the present disclosure is to provide a carrier and method of use that is easily removable to lessen impact on fuel economy and range mileage for the towing vehicle when the carrier is not being used.

A further object, feature, and/or advantage of the present disclosure is to provide temporary additional cargo capacity to allow consumers to benefit from more fuel-efficient vehicles when additional cargo capacity is not needed.

A still further object, feature, and/or advantage of the present disclosure is to provide a carrier and method of use that may be utilized across a variety of makes, models and manufacturers of towing vehicles.

Another object, feature, and/or advantage of the present disclosure is to provide a carrier and method of use that is inexpensive to manufacture, easy to repair, and comprised of lightweight and durable materials.

Other objects, features, and advantages of this disclosure will become apparent from the following description taken in conjunction with the accompanying drawing wherein are set forth, by way of illustration and example and without limitation, certain aspects of this disclosure. The present disclosure is not to be limited to or by these objects, features, and advantages. No single aspect need provide each and every object, feature, or advantage.

BRIEF DESCRIPTION OF THE DRAWINGS

FIGS. 1-6 represent aspects of the carrier and method of the present disclosure.

FIG. 1 is a perspective view of one aspect of the present disclosure showing a carrier coupled to a towing vehicle.

FIG. 2 is a top plan view of the carrier of FIG. 1.

FIG. 3 is a bottom plan view of the carrier of FIG. 1.

FIG. 4 is a right-side view of the carrier of FIG. 1 coupled to the towing vehicle, the left-side view being a mirror image.

FIG. 5 is a front-side view of the carrier of FIG. 1 coupled to the towing vehicle.

FIG. 6 is a rear-side view of the carrier of FIG. 1 coupled to the towing vehicle.

DETAILED DESCRIPTION OF THE INVENTION

Referring generally to FIGS. 1-6, the present disclosure is directed to a wheeled carrier (10) intended to be coupled to a towing vehicle (12) and a method of use that expands the cargo capacity of the towing vehicle (12). It is contemplated that the carrier (10) and method of the present disclosure may be utilized across a variety of makes, models and manufacturers of towing vehicles (12). Non-limiting examples of towing vehicles (12) contemplated by the present disclosure may include smaller, more fuel-efficient automobiles such as a car or pick-up truck, a motorcycle, an ATV, or a golf cart. The carrier (10) and method of use of the present disclosure is designed to be conveniently and reliably coupled to the towing vehicle (12) in a manner that minimizes safety concerns while driving. It is further contemplated that the carrier (10) and method of the present disclosure is easily removable to lessen impact on fuel economy and range mileage for the towing vehicle when the carrier is not being used While certain aspects of the present disclosure are shown and described herein, it is understood that such aspects are merely exemplary. The present disclosure is not intended to be limited to these specific aspects and may encompass other aspects or embodiments. Therefore, specific compositional and process details disclosed herein are not to be interpreted or inferred as limiting, but merely as a basis for the claims and as a representative basis for teaching one skilled in the art how to make and use the disclosed subject matter.

It must further be noted that the singular terms "a," "an," and "the" as used herein may include plural referents unless the context clearly dictates otherwise. As used herein, in particular aspects, the terms "about" or "approximately" when preceding a numerical value indicates the value plus or minus a range of 0.2, 0.4, 0.6, 0.8 or 1 inch. In other aspects, the terms "about" or "approximately" when preceding a numerical value indicates the value plus or minus a range of 2, 3, 4 or 5 inches. In yet other aspects, the terms "about" or "approximately" when preceding a numerical value indicates the value plus or minus a range of 6, 7, 8, 9, 10, 11 or 12 inches. Furthermore the transitional phrase "comprising" that is synonymous with "including," "containing," and "characterized by" as used herein is inclusive or open-ended and does not exclude additional, unrecited elements, steps or ingredients. Alternatively the transitional phrase "consisting of" as used herein is closed and excludes any element, step or ingredient not specified.

Figure 1:
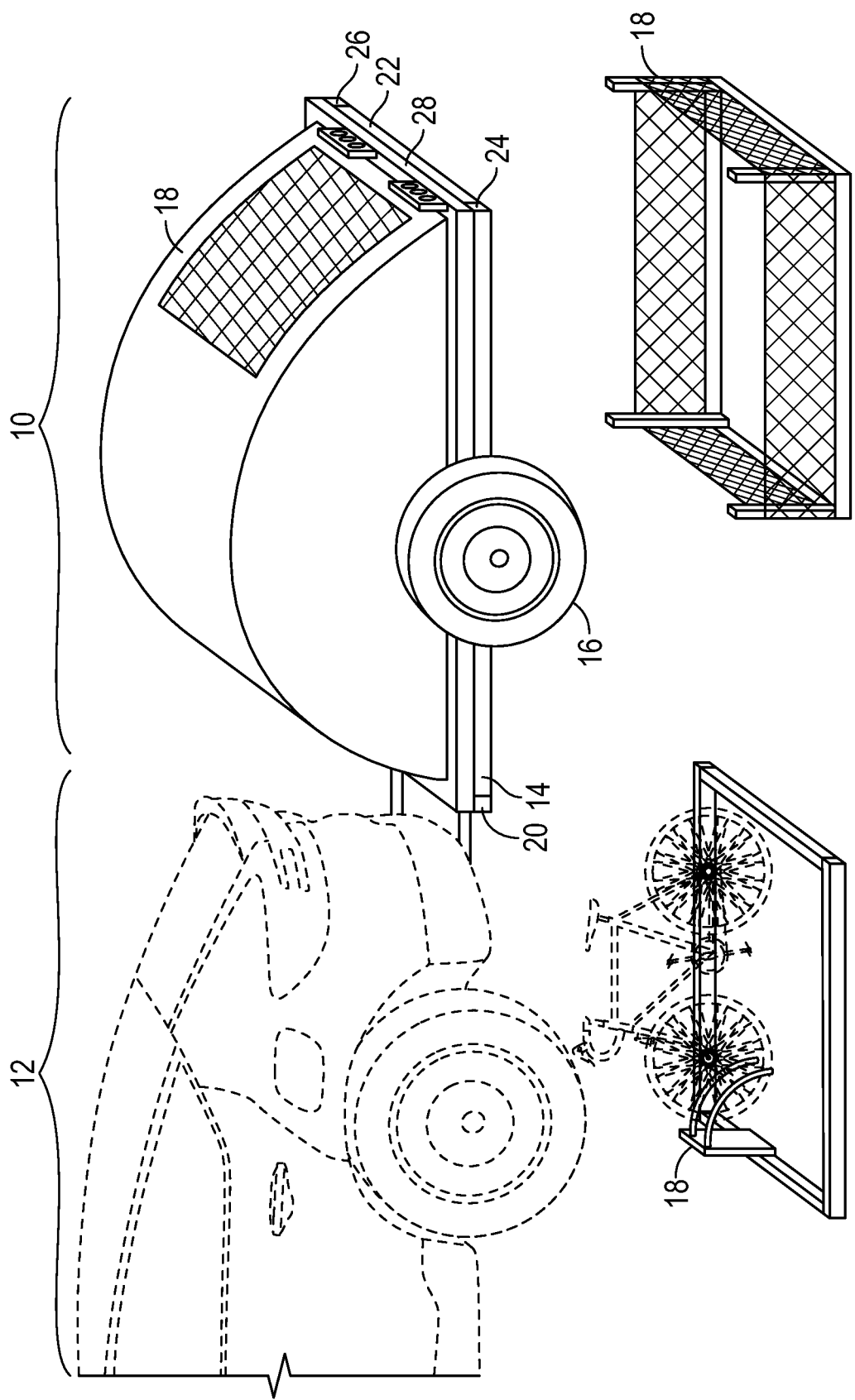

FIG. 1 illustrates one aspect of the present disclosure, in particular, a carrier (10) for a towing vehicle (12). The carrier (10) may comprise a rigid framework (14) having at least two wheels (16) located on opposite sides of the framework (14). The framework (14) may further comprise a body (18) removably attached to the framework (14). Shown in FIG. 1 for illustrative purposes only, the body (18) may comprise a style for transporting luggage having a weather tight shell and a rearwardly hinged lid. Other types of body styles (18) are also contemplated by the present disclosure. For example, bodies (18) may include other styles configured to transport bikes, skis, snow boards, sports equipment, tools, water skis, small animals, groceries, surfboards, and other types of cargo depending on the various needs of the consumer. It is contemplated by the present disclosure that the various types of body styles (18) are interchangeable on the framework (14), such that the carrier (10) may support a wide variety of uses depending on certain preferences of the consumer.

Figure 2:
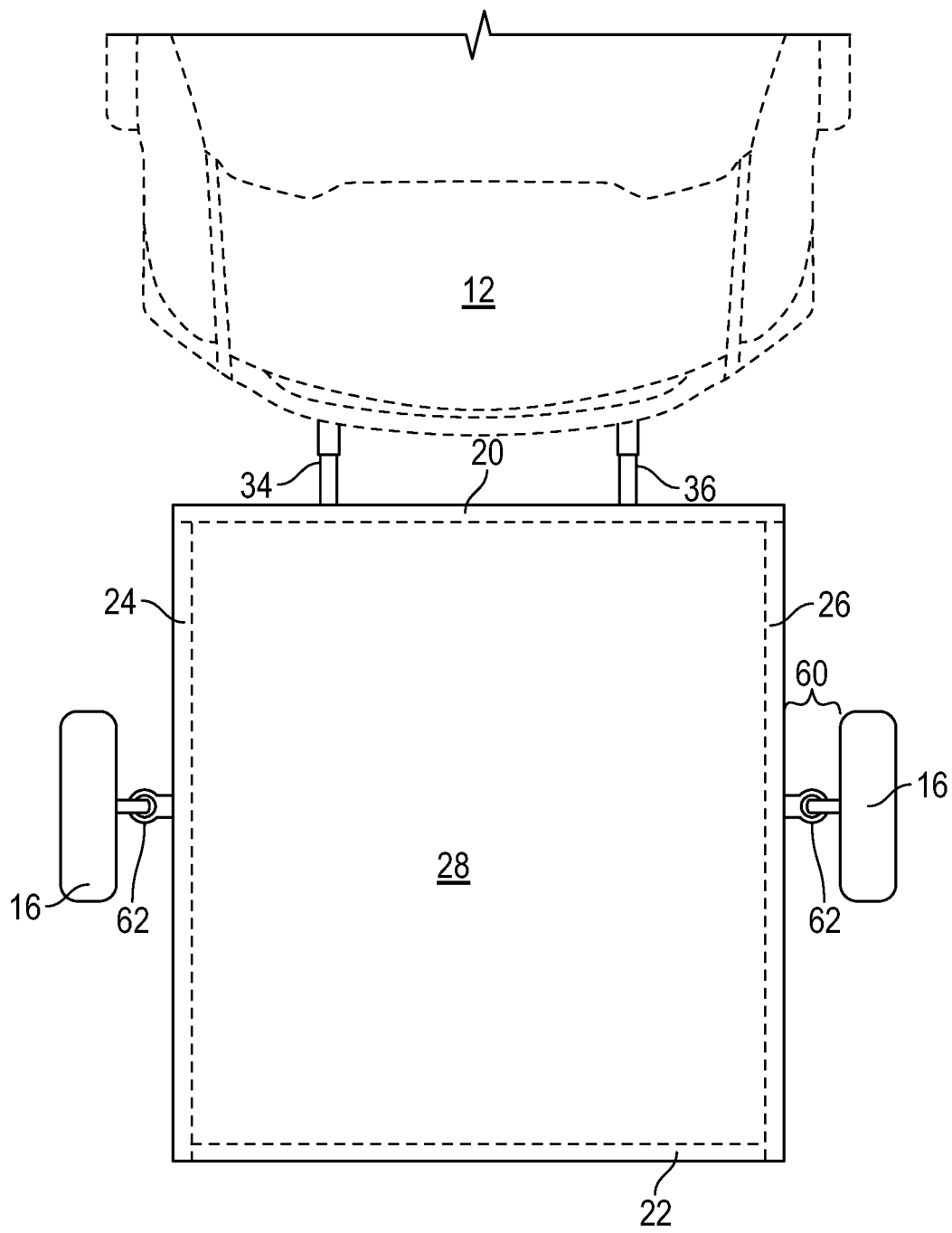

FIG. 2 illustrates a top plan view of the carrier (10) coupled to the towing vehicle (12), wherein the body (18) is shown removed from the framework (14). In particular, the framework (14) may comprise a front member (20) and a rear member (22) running parallel to one another and perpendicular to the direction of travel of the towing vehicle (12). The framework (14) may further comprise a first lateral member (24) and a second lateral member (26) running parallel to one another and in the same direction of travel of the towing vehicle (12). The front member (20), rear member (22), first and second lateral members (24, 26) may each be cut from square or round section tubing formed of various types of rigid and durable materials, such as metal, steel, plastics, aluminum or combinations thereof. The front member (20), rear member (22), first and second lateral members (24, 26) may be rigidly secured together at each end, respectively, in a coplanar relationship to form the general shape of a square or rectangle approximately 4-12 feet in length and approximately 2-8 feet in width. The front member (20), rear member (22), first and second lateral members (24, 26) may be secured together permanently (e.g., welding or adhesives) or removably secured together (e.g., bolts, nuts, or screws). For ease of packaging, these members (20, 22, 24, 26) may be shipped in separate pieces and secured together by the consumer upon receipt using standard tools in a common toolbox. Alternatively, the front member (20), rear member (22), first and second lateral members (24, 26) may be formed together integrally in the manufacturing process. The framework (14) may further comprise coplanar struts (not shown) to bridge the front member, rear member, first lateral member, or second lateral members (20, 22, 24, 26) to further reinforce the strength and rigidity of the framework (14). The struts may be formed of the same type of tubing and materials as the front member, rear member, or first lateral member and second lateral members (20, 22, 24, 26).

Shown in FIG. 2, the body (18) may be removably attached to the framework (14) via an intermediate platform (28). The platform (28) provides a universal mounting base that is configured to accommodate bodies (18) of a wide variety of styles, sizes and configurations. In particular, the platform (28) is designed such that the various body styles (18) may be removably and interchangeably attached to the framework (14) in a manner that is convenient for the consumer to perform individually and at home, for example, by using clamps, nuts/bolts or other types of removable and reliable attachment.

Figure 3:
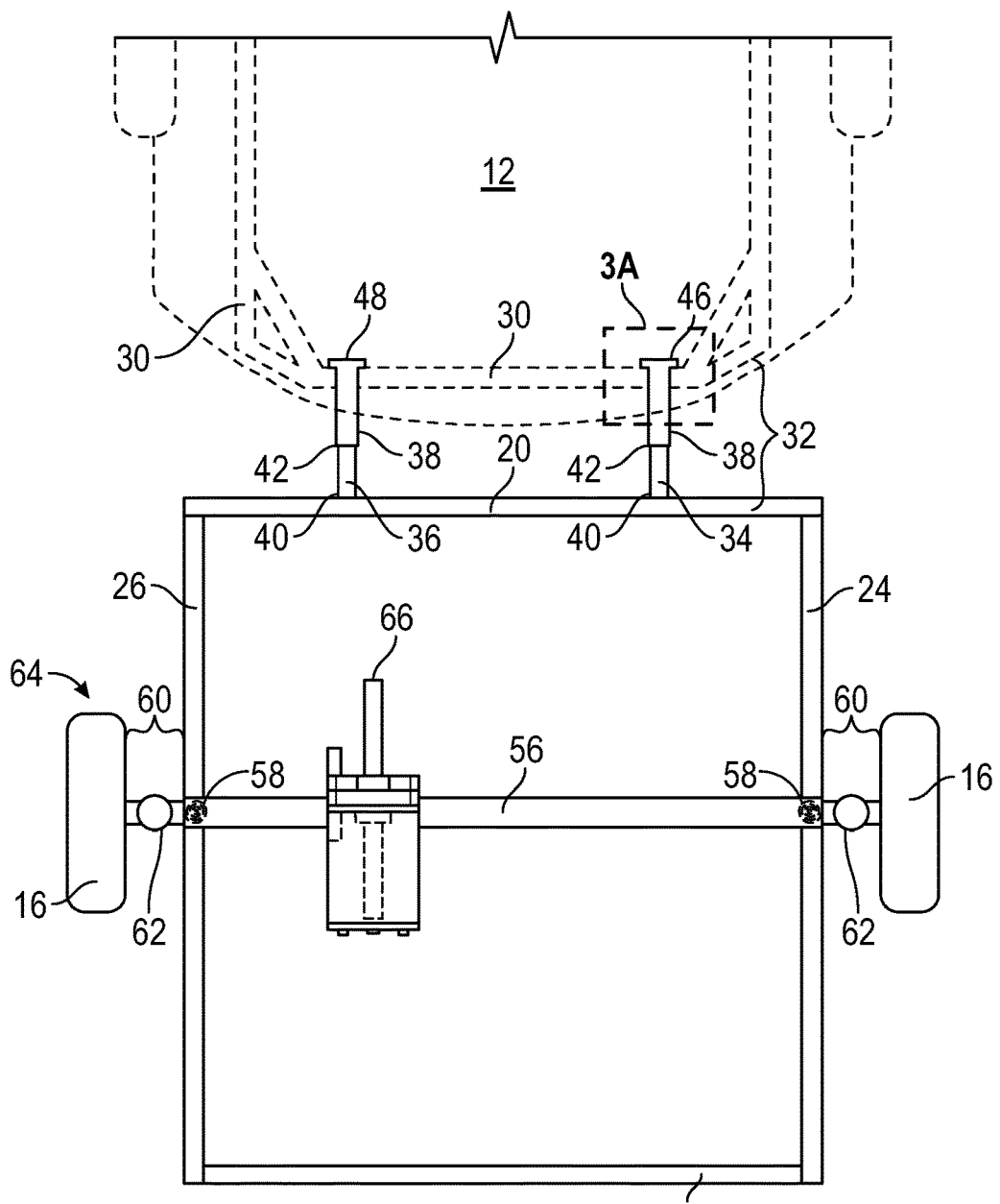

FIG. 3 illustrates a bottom plan view of the carrier (10) coupled to the towing vehicle (12). In particular, the carrier (10) is not coupled to the towing vehicle (12) using a ball mounted hitch, pivoting pin box, pivot point, sliding hitch, or other types of removable hitches common in the towing industry. Rather, the carrier (10) is directly coupled to the chassis (30) of the towing vehicle (12) via a carrier coupler (32). Also known as the towing vehicle's frame, the chassis (30) is the main support structure of the towing vehicle (12) to which all other vehicle components are attached. By directly coupling the carrier (10) to the chassis (30) of the towing vehicle (12) via the carrier coupler (32), the overall length of the towing vehicle (12) and attached carrier (10) is shortened. Shortening the overall length of the towing vehicle (12) and attached carrier (10) improves stability and safety by reducing its turning radius as compared to traditional trailers.

Shown in FIG. 3, the carrier coupler (32) may comprise a first extension arm (34), a second extension arm (36), and at least two coupling mechanisms (38). The first and second extension arms (34, 36) may be formed of the same type of tubing and rigid materials as the front, rear, first and second lateral members (20, 22, 24, 26) of the framework (14). In particular, the first and second extension arms (34, 36) may each comprise a proximal first end (40) and a distal second end (42). The proximal first ends (40) of the first and second extension arms (34, 36) may be fixedly secured to the front member (20) of the framework (14). The proximal first ends (40) may be fixedly secured to the front member (20) permanently (e.g., welding or adhesive) or removably secured together (e.g., bolts, nuts, or screws) for ease of packaging and shipping as previously discussed. Alternatively, the proximal first ends (40) may be fixedly secured to the front member (20) integrally in the manufacturing process.

Also shown in FIG. 3, the first and second extension arms (34, 36) may extend forward from the front member (20) in a coplanar relationship. Coplanar struts (not shown) may also be included to bridge the first and second extension arms (34, 36) to provide further support and to help maintain spacing between the extensions. The struts may be formed of the same type of tubing and materials as the first and second extension arms (34, 36).

Further shown in FIG. 3, the distal second ends (42) of the first and second extension arms (34, 36) may each comprise a coupling mechanism (38). The design of the coupling mechanism (38) is such that the consumer may conveniently, reliably and removably couple the extension arm (34, 36) of the carrier (10) directly to the chassis (30) of the towing vehicle (12). Importantly, the coupling mechanism (38) is configured to form a rigid joint (44) between the extension arm (34, 36) and the chassis (30) that does not flex or pivot. In particular, the coupling mechanism (38) on the distal second end (42) of the first extension arm (34) may form a rigid joint (44) with the chassis (30) at a first position (46). The coupling mechanism (38) on the distal second end (42) of the second extension arm (36) may also form a rigid joint (44) with the chassis (30) at a second position (48). The first and second positions (46, 48) may be spaced approximately 2-8 feet apart on the chassis (30) of the towing vehicle (12). In effect, the two rigid joints (44) cause the first and second extension arms (34, 36) of the carrier (10) to become a fixed extension of the chassis (30) of the towing vehicle (12). Directly coupling the carrier (10) to the towing vehicle (12) via the rigid joints (44) at two distinct positions (46, 48) on the chassis (30) adds significant stability to the carrier (10) while driving. This added stability reduces flex, bounce and sway between the towing vehicle (12) and the carrier (10) to prevent fishtailing which can result in an overturned trailer or cause the driver to lose control. Thus, directly coupling the carrier (10) to the chassis (30) of the towing vehicle (12) at multiple positions (46, 48) minimizes the dangerous effects of trailer sway caused by unbalanced loads, wind gusts or uneven pavement while towing. Such added stability is an improvement over traditional trailers that are pivotably and flexibly coupled to the towing vehicle at a single location.

Figure 3A:
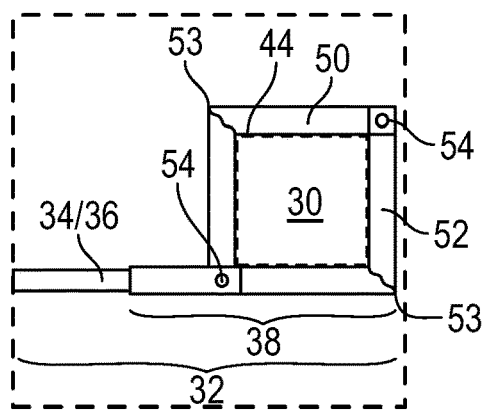
FIG. 3A is a close-up view showing one aspect of a coupling mechanism for connecting the carrier of FIG. 1 to the towing vehicle.

FIG. 3A illustrates a close-up view showing one aspect of the coupling mechanism (38). Shown in FIG. 3A for illustrative purposes only, the coupling mechanism (38) may comprise a claw (50), clamp (52), hinge (53), and locking device (54) configured to form the rigid joint (44) between the extension arm (34, 36) and the chassis (30) of the towing vehicle (12). Other types of coupling mechanisms (38) are also contemplated by the present disclosure that allow the consumer to conveniently, reliably and removably couple each extension arm (34, 36) to the chassis (30) of the towing vehicle (12). The carrier (10) and method of use allows for convenient coupling and decoupling to the towing vehicle (12). Moreover, uncoupling allows the towing vehicle (12) to return to its more efficient fuel economy and range mileage when the carrier (10) is not being used.

Still further shown in FIG. 3, the carrier (10) may comprise at least one axle structure (56) attached to the framework (14). In particular, the axle (56) may be attached to the framework (14) using a vertical suspension system (58) such as those commonly utilized in the industry (e.g., leaf springs, torsion, coil springs, rubber compression). The carrier (10) may also comprise at least one wheel (16) attached to each end of the axle (56) via a passive steering assembly (60). The passive steering assembly (60) may comprise a pivot point (62) designed to permit the wheels (16) to passively turn (64) in the direction of travel of the towing vehicle (12). The passive steering assembly (60) thus enables the carrier (10) of the present disclosure to maintain a shorter turning radius as compared to traditional trailers while offering high roll stability due to its smaller spatial requirements.

FIG. 4 illustrates a right-side view of the carrier (10) coupled to the towing vehicle (12), wherein the left-side view is a mirror image. Shown in FIG. 4, the framework (14) of the carrier (10) is configured to remain in close proximity to the rear of the towing vehicle (12) with only about 2-6 feet separating the framework (14) and the towing vehicle (12). Having the framework (14) of the carrier (10) in such close proximity to the rear of the towing vehicle (12) ensures that the overall length of the carrier (10) and towing vehicle (12) remains minimal to assist with maintaining a shorter turning radius for sharper cornering, adding stability to the carrier (10) to reduce sway, and distributing weight more evenly on the axle (56) during operation. In particular, the first and second extension arms (34, 36) of the carrier coupler (32) may each comprise a fixed length of approximately 4-8 feet. Alternatively, the first and second extension arms (34, 36) may each comprise telescoping sections such that the first and second extension arms may be extendible from approximately 4-6 feet to approximately 8-12 feet in overall length to fit a variety of different towing vehicle sizes, makes, models and manufacturers. It is further contemplated by the present disclosure that the telescoping sections may include locking pins, rings or clips to ensure a secure connection between the sections so that the extension arms (34, 36) remain a fixed length during use. Coplanar struts (not shown) may also be included to bridge the first and second extension arms (34, 36) to provide further support and to help maintain equidistant spacing of the extensions. The struts may be formed of the same type of tubing and materials as the first and second extension arms (34, 36).

Figure 5:
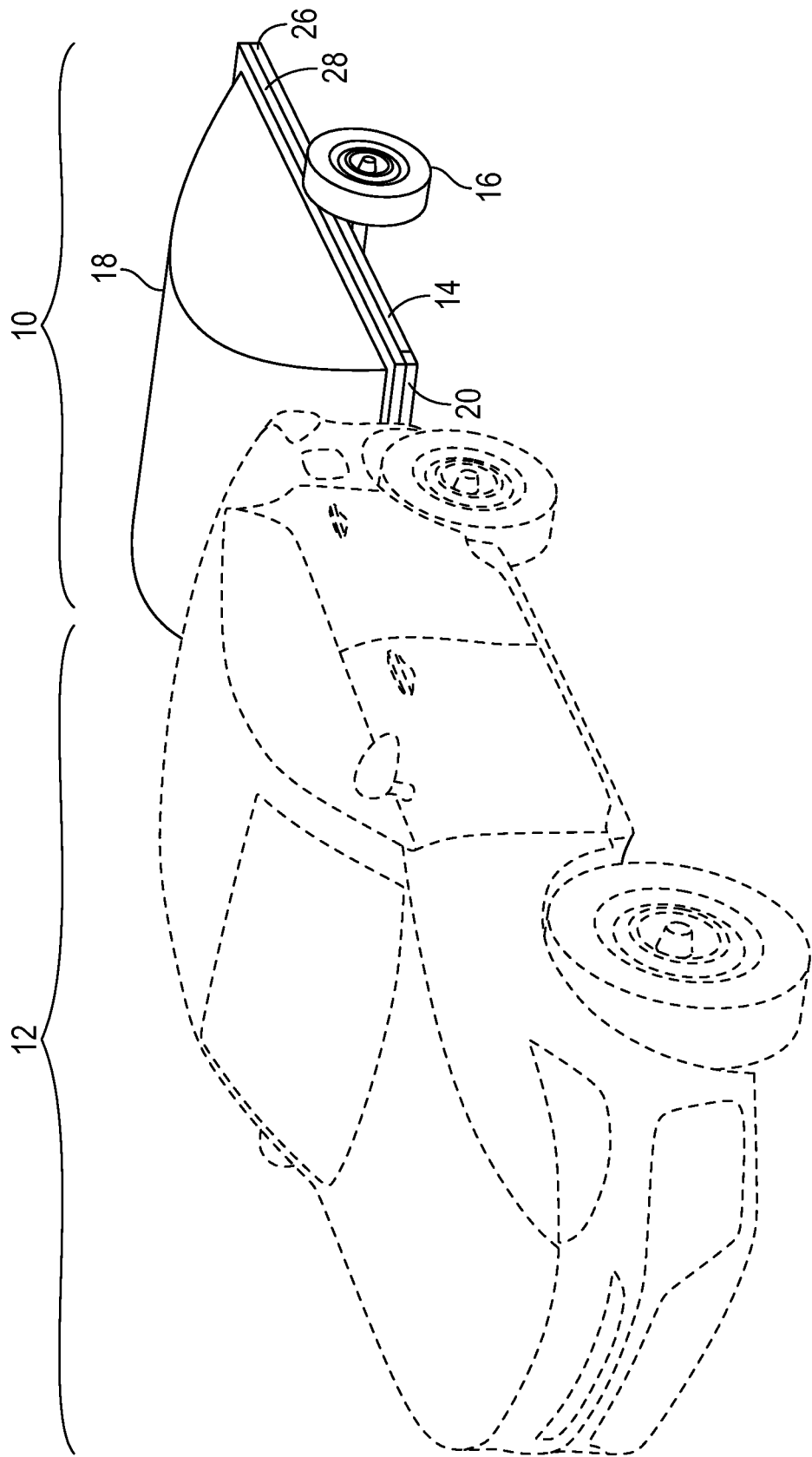
Figure 6:
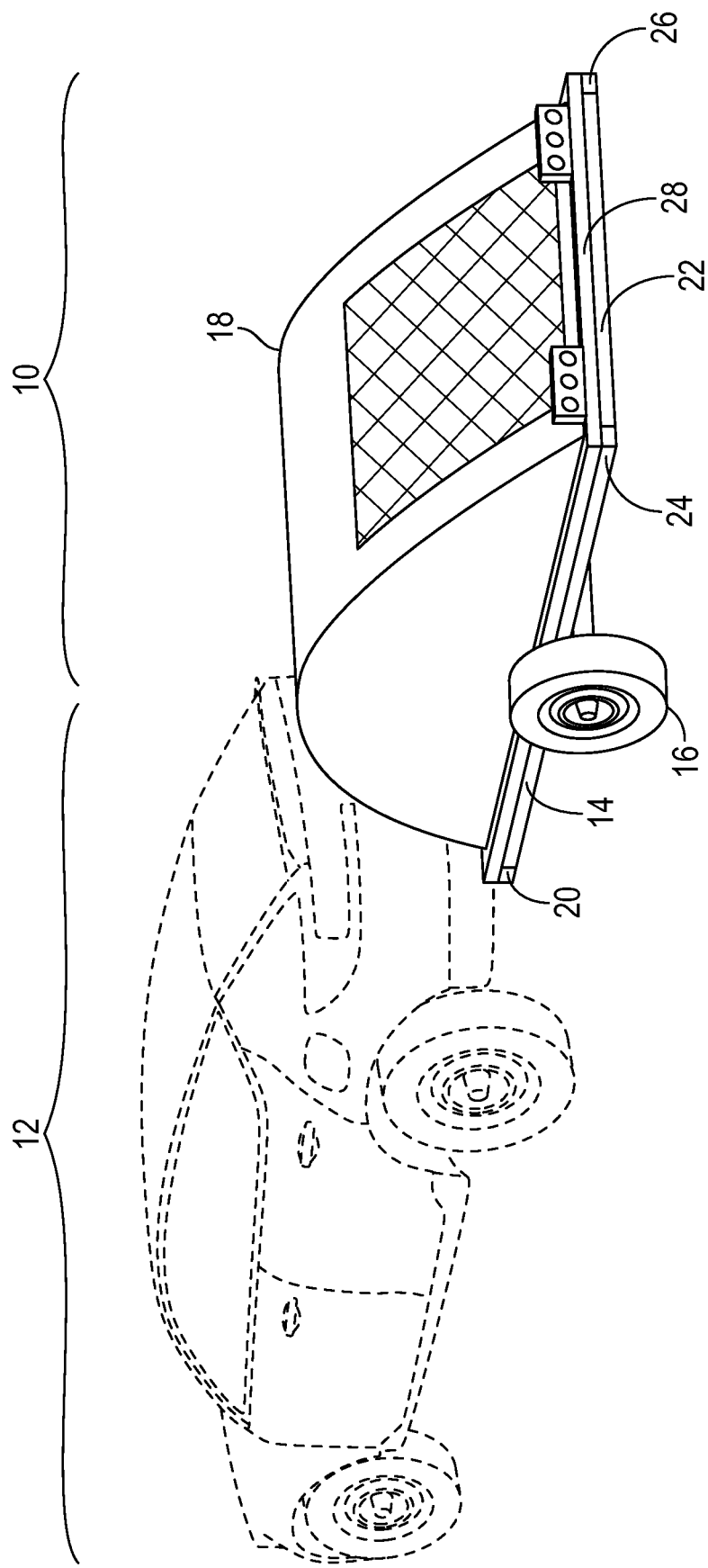

FIG. 5 illustrates a front-side view of the carrier (10) coupled to the towing vehicle (12). FIG. 6 illustrates a rear-side view of the carrier (10) also coupled to the towing vehicle (12). Shown in both FIGS. 5 and 6, the carrier (10) of the present disclosure may include work lights, running lights, turning signals, braking lights, and reflectors to provide additional safety and utility during operation of the carrier (10). It is also contemplated by the present disclosure that the carrier (10) may incorporate braking systems (not shown) that are coupled to the braking system of the towing vehicle (12). Such braking systems may be configured to aid the towing vehicle (12) with braking while pulling heavy loads for improved safety. However, it is contemplated by the present disclosure that such braking systems may not be necessary due to the carrier's (10) small stature.

Another aspect of the present disclosure is a method of using the carrier (10) of FIGS. 1-6 for transporting cargo. In particular, the method may comprise providing a towing vehicle (12) in need of additional cargo space, such as a smaller, more fuel-efficient automobile, a motorcycle, an ATV, or a golf cart. The method may further comprise providing cargo in need of transportation. The method may also include providing a carrier (10) for transporting the cargo. A particular style of body (18) for the carrier (10) may be selected depending on the type of cargo to be transported, such as a body (18) for transporting luggage, bikes, skis, snow boards, sports equipment, tools, water skis, groceries, surfboards, or other types of cargo depending on the various needs of the consumer. The method may further comprise attaching the selected body (18) to the framework (14) of the carrier (10) via the intermediate platform (28) using clamps, nuts/bolts or other types of removable and reliable attachment.

The method of the present disclosure may further include coupling the carrier (10) to the towing vehicle (12). The carrier (10) is not coupled to the towing vehicle (12) using a ball mounted hitch, pivoting pin box, pivot point, sliding hitch, or other types of removable hitches common in the towing industry. Instead the carrier (10) is directly coupled to the chassis (30) of the towing vehicle (12) via the carrier coupler (32). In particular, the first and second extension arms (34, 36) of the carrier coupler (32) may be extended to reach the chassis (30) of the towing vehicle (12). The method may further include utilizing the coupling mechanism (38) of the carrier coupler (32) to form a rigid joint (44)

between each extension arm (34, 36) and the chassis (30) of the towing vehicle (12) that does not flex or pivot. The method may further include rigidly coupling the carrier (10) to the towing vehicle (12) via the two rigid joints (44) at two distinct positions (46, 48) on the chassis (30) to add significant stability to the carrier (10) while towing.

The method of the present disclosure may also comprise towing the carrier (10) rigidly coupled to the towing vehicle (12) to a desired location. Once at the desired location, cargo may be unloaded from the carrier (10) and the carrier (10) uncoupled from the chassis (30) using the coupling mechanism (38) of the carrier coupler (32). The body (18) may be removed from the framework (14) of the carrier (10) via the intermediate platform (28). The carrier (10) may then be conveniently stored until further use is required for transporting cargo while utilizing a smaller, more fuel-efficient vehicle.

The carrier (10) and method of use of the present disclosure are universally applicable to vehicles of all, makes, models, sizes and manufacturers. Although the disclosure has been described and illustrated with respect to preferred aspects thereof, it is not to be so limited since changes, modifications, and combinations thereof may be made which are within the full intended scope of the disclosure.

What is claimed is:

1. A wheeled carrier, comprising:
a framework having an axle and at least two wheels;
the framework comprising:
   a) a front member;
   b) a rear member running parallel to the front member;
   c) the front member and rear member running perpendicular to a direction of travel of a towing vehicle;
   d) a first lateral member;
   e) a second lateral member running parallel to the first lateral member;
   f) the first lateral member and the second lateral member running in the same direction of travel of the towing vehicle;
   g) the front member, rear member, first and second lateral members rigidly secured together in a coplanar relationship to form the shape of a square or rectangle;
a platform on the framework, the platform comprising:
   a) a universal mounting base that is configured to accommodate bodies of a wide variety of styles, sizes and configurations;
   b) the platform designed to removably, interchangeably and conveniently attach the body to the framework;
a body removably attached to the framework via the platform, the body comprising:
   a) a luggage compartment;
   b) a bicycle rack;
   c) a watersports rack;
   d) a crate for small animals;
   e) a sports equipment rack;
   f) a grocery compartment;
   g) a tool rack; or
   h) a cargo compartment;
a carrier coupler secured to the framework, the carrier coupler comprising:
   a) a first extension arm having a proximal first end and a distal second end;
   b) a second extension arm having a proximal first end and a distal second end;
   c) the proximal first end of the first extension arm secured to the front member of the framework;
   d) the proximal first end of the second extension arm secured to the front member of the framework;
   e) a first coupling mechanism attached to the distal second end of the first extension arm;
   f) a second coupling mechanism attached to the distal second end of the first extension arm;
   g) wherein each coupling mechanism is configured to form a rigid joint between a frame of the towing vehicle and the extension arm; and
the carrier directly coupled to the frame of the towing vehicle via the carrier coupler at multiple positions on the frame;
wherein the carrier coupler does not comprise a ball mounted hitch, pivoting pin box, pivot point, or sliding hitch.

2. The wheeled carrier of claim 1, wherein the plurality of extension arms are of a fixed length.

3. The wheeled carrier of claim 2, wherein the plurality of extension arms are extendable in overall length to fit a variety of different towing vehicle sizes, makes, models and manufacturers.

4. The wheeled carrier of claim 3, the axle and at least two wheels comprising:
a passive steering assembly having a pivot point; and
the passive steering assembly configured that the wheels passively turn in the direction of travel of the towing vehicle via the pivot point.

5. The wheeled carrier of claim 3, the axle and at least two wheels comprising electric motors configured to power the wheels of the carrier to provide driving force while driving.

6. A wheeled carrier, comprising:
a framework having an axle and at least two wheels;
a platform on the framework;
a body attached to the framework via the platform;
a carrier coupler secured to the framework; and
the carrier directly coupled to a frame of a towing vehicle via the carrier coupler;
wherein the carrier coupler does not comprise a ball mounted hitch, pivoting pin box, pivot point, or sliding hitch.

7. The wheeled carrier of claim 6, the framework comprising:
a front member;
a rear member running parallel to the front member;
the front member and rear member running perpendicular to the direction of travel of the towing vehicle;
a first lateral member;
a second lateral member running parallel to the first lateral member; and
the first lateral member and the second lateral member running in the same direction of travel of the towing vehicle;
wherein the front member, rear member, first and second lateral members rigidly secured together in a coplanar relationship to form the shape of a square or rectangle.

8. The wheeled carrier of claim 6, the platform comprising:
a universal mounting base that is configured to accommodate bodies of a wide variety of sizes, types and configurations;
wherein the platform is designed to removably, interchangeably and conveniently attach the body to the framework.

9. The wheeled carrier of claim 6, the body comprising:
a) a luggage compartment;
b) a bicycle rack;
c) a watersports rack;

d) a crate for small animals;
e) a sports equipment rack;
f) a grocery compartment;
g) a tool rack; or
h) a cargo compartment.

10. The wheeled carrier of claim 6, the carrier coupler comprising:
    a plurality of extension arms; and
    at least two coupling mechanisms.

11. The wheeled carrier of claim 10, the plurality of extension arms each comprising:
    a proximal first end;
    a distal second end;
    the proximal first end of each extension arm fixedly secured to the front member of the framework; and
    the distal second end of each extension arm comprising a coupling mechanism.

12. The wheeled carrier of claim 11, wherein the plurality of extension arms are of a fixed length.

13. The wheeled carrier of claim 11, wherein the plurality of extension arms are extendable in overall length to fit a variety of different towing vehicle sizes, makes, models and manufacturers.

14. The wheeled carrier of claim 11, wherein each coupling mechanism is configured to form a rigid joint between the frame of the towing vehicle and an extension arm.

15. The wheeled carrier of claim 14, wherein the plurality of extension arms are directly coupled to the frame of the towing vehicle via the rigid joints at multiple positions on the frame.

16. The wheeled carrier of claim 6, the axle and at least two wheels comprising:
    a passive steering assembly having a pivot point;
    the passive steering assembly configured that the wheels passively turn in the direction of travel of the towing vehicle via the pivot point.

17. The wheeled carrier of claim 6, the axle and at least two wheels comprising electric motors configured to power the wheels of the carrier to provide driving force while driving.

18. A method of using a wheeled carrier, comprising:
    providing a towing vehicle;
    providing a carrier for transporting cargo, the carrier comprising:
    a) a framework having an axle and at least two wheels;
    b) a platform on the framework;
    c) a body for attachment to the framework via the platform; and
    d) a carrier coupler secured to the framework;
    e) a passive steering assembly attached to the axle and at least two wheels;
    f) the passive steering assembly having a pivot point; and
    g) the passive steering assembly configured that the wheels passively turn in the direction of travel of the towing vehicle via the pivot point;
    selecting a particular style of body depending on the type of cargo to be transported;
    attaching the selected body to the framework via the platform;
    coupling the carrier directly to a frame of the towing vehicle using the carrier coupler, wherein the carrier coupler does not comprise a ball mounted hitch, pivoting pin box, pivot point, or sliding hitch;
    towing the carrier using the towing vehicle to a desired location;
    unloading cargo from the carrier at the desired location;
    uncoupling the carrier from the frame of the towing vehicle using the carrier coupler; and
    storing the carrier until further use is required for transporting cargo.

19. The method of using a wheeled carrier of claim 18, further comprising:
    providing the carrier coupler with a plurality of extension arms and at least two coupling mechanisms;
    extending each extension arm of the plurality of extension arms to reach the frame of the towing vehicle; and
    forming a rigid joint between each extension arm and the frame of the towing vehicle using the at least two coupling mechanisms.

20. The method of using a wheeled carrier of claim 19, further comprising:
    rigidly coupling the carrier to the towing vehicle via the two rigid joints at multiple positions on the frame of the towing vehicle to add stability to the carrier while towing.

* * * * *